United States Patent Office 3,195,179
Patented July 20, 1965

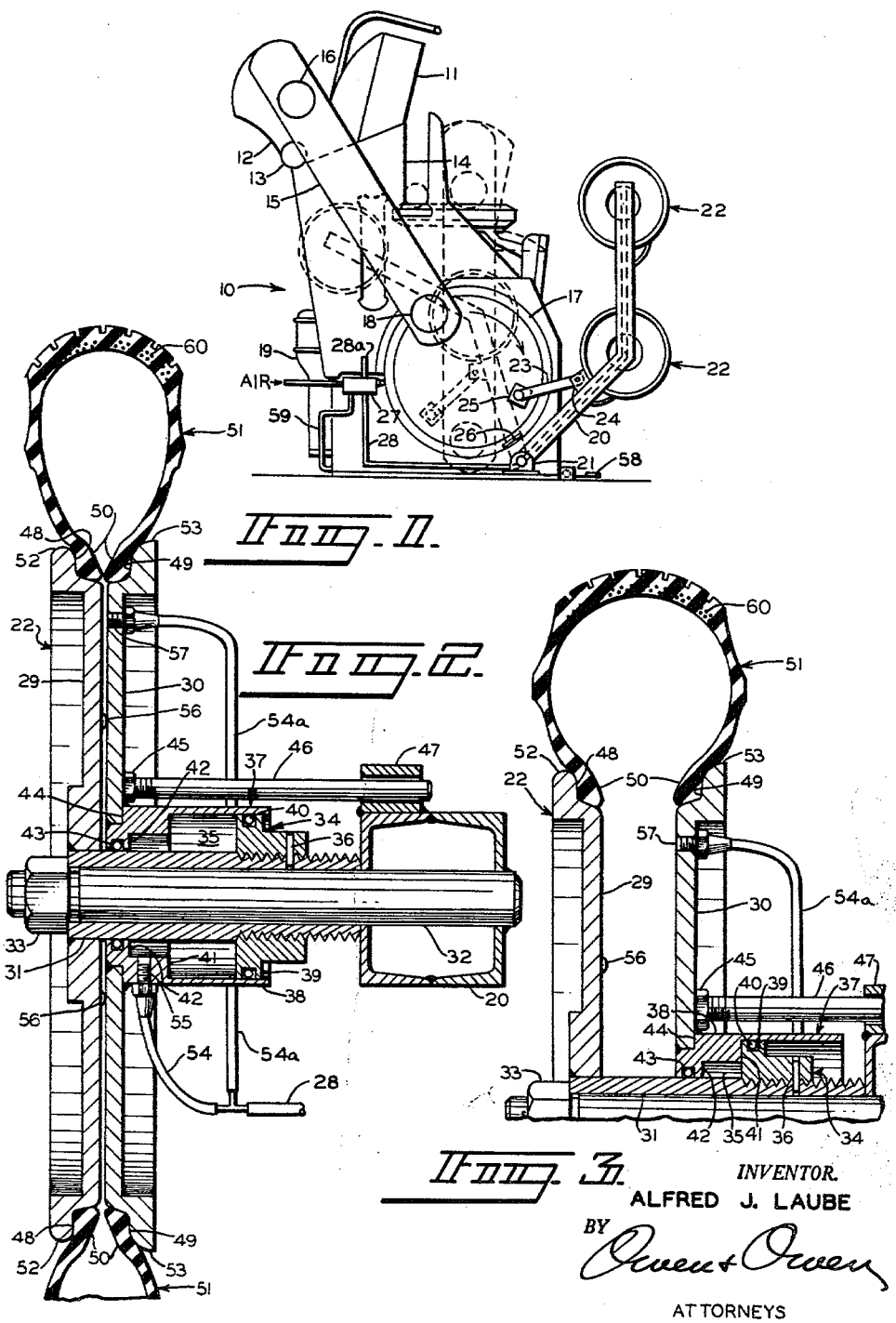

---

3,195,179
RIM FOR POST CURING INFLATION OF PNEUMATIC TIRES
Alfred J. Laube, Findlay, Ohio, assignor to Cooper Tire and Rubber Company, Findlay, Ohio, a corporation of Delaware
Filed Dec. 26, 1961, Ser. No. 161,831
2 Claims. (Cl. 18—2)

This invention relates to a rim for use in the post curing inflation of pneumatic tires as for example on the apparatus described and claimed in U.S. Patent No. 2,948,921 to Laube et al and this application is a continuation-in-part of my co-pending application Serial No. 75,719, now abandoned.

As explained in the said patent, post curing inflation of pneumatic tire casings has been developed in order to overcome the disadvantage, inherent particularly in nylon cord tires, of growth of a tire during normal service which frequently causes a multiplicity of small cracks to appear in the tread grooves. According to the patent referred to, this inherent problem resulting from the stretching of the nylon cords can be overcome by placing the tire on a rim immediately after curing and inflating it to an extent greater than that to which it will be inflated in its normal road usage. The tire is allowed to cool to room temperature while it is stretched to this extent and, therefore, it cools at the larger, stretched size. Afterwards, during normal road usage, the tire grows no further and cracks do not develop in the tread area.

Mounting a freshly molded tire upon a conventional rim is, however, difficult because at the elevated temperature at which the tire is removed from the molding machine, it is soft and somewhat "flabby" so that its normal resiliency which tends to separate its rim beads is not present and it is difficult to properly seat the rim beads in a mounting rim. This is particularly true with respect to tubeless tires which are so designed as to require firm and uniform setting of the beads in the rim in order to prevent the escape of air from the interior of the tire.

It is therefore the principal object of the instant invention to provide a rim mechanism particularly designed for the post curing inflation of pneumatic tires and having provisions for the easy mounting of a pneumatic tire casing thereon even when the tire casing is warm and relatively limp immediately after initial molding and also including means whereby air pressure itself is relied upon both to separate the rim beads of the tire from each other and to insure their being set in air-tight contact with the rim elements.

This principal object of the invention and other objects and advantages thereof will be better understood by reference to the specification which follows and to the drawings in which:

FIG. 1 is a view in side elevation of a typical tire curing machine illustrating one type of apparatus with which a rim embodying the invention is adapted to be employed;

FIG. 2 is a vertical, sectional view of an apparatus embodying the invention showing the rim in position for the initial seating of the rim beads of a just-cured pneumatic tire casing, and drawn on an enlarged scale; and FIG. 3 is a fragmentary, vertical sectional view showing the upper half of the apparatus embodying the invention but with the rim in the position wherein the rim beads of the tire have been separated axially from each other into their normal road position, are set firmly in air-tight contact with the rim elements and air has been admitted to the interior of the tire for post curing inflation.

A tire molding apparatus 10 of the type illustrated in FIG. 1 includes a pneumatic tire forming mold comprising a mold top 11 and a mating mold bottom (not shown) each of which has an interior surface for molding one-half of a pneumatic tire divided along its medium plane, perpendicular to its axis. The apparatus 10 as illustrated has two molds, each having a mold top 11 which is mounted upon a bridge structure which includes a rider 12 and a roller 13 carried thereby. The roller 13 rides on the contoured edge of a heavy steel guide plate 14, there being one of the guide plates 14 at each side of the apparatus. The mold tops 11 are moved from the open position, illustrated in FIG. 1, to closed position wherein they are swung forwardly and downwardly, by the action of a pair of heavy walking beams 15, one of which is shown in FIG. 1 and the other of which is located at the opposite side of the apparatus 10. Each of the walking beams 15 is connected to its respective rider 12 by a trunnion 16 and to a heavy flywheel 17 by a crank 18. Driving mechanism for the apparatus 10 includes a powerful motor 19 and suitable gearing and controls whereby the flywheel 17 is rotated in a clockwise direction (FIG. 1) to close the mold and then after a controlled period of time, in a counter-clockwise direction to open the mold.

The apparatus of U.S. Patent No. 2,948,921 includes a lever 20 pivoted at its lower end in a yoke 21 which is rigidly connected to the floor or the main frame of the apparatus 10. The lever 20 oscillates back and forth in a vertical plane moving between the position of FIG. 1 and a lower retracted position (illustrated in FIG. 1 in dotted lines) as the molding apparatus 10 opens and closes. The lever 20 mounts a pair of post curing rims 22. The lever 20 is connected by a link 23 to the flywheel 17, the link 23 being pivotally attached to a yoke 24 on the lever 20 and to a crank pin 25 on the flywheel 17. An actuator 26 is also carried by the flywheel 17 in position to actuate an air control valve 27 for an air line 28 and air exhaust line 28a when the mold of the apparatus 10 closes and when it starts to open, as well be described below.

Each of the rims 22 embodying the instant invention comprises two rim halves 29 and 30 (FIG. 2). The rim half 29 is disc shaped and is rigidly secured, for example by a pin, weld or key, to the front end of a cylindrical member, in this embodiment of the invention a heavy sleeve 31 which is mounted circumjacently by a strut 32. The strut 32 is rigidly secured in the lever 20. The sleeve 31 is held in position on the strut 32 by a heavy locknut 33 threaded on a reduced end of the strut 32 and bearing against the outboard end of the sleeve 31. The interior end of the sleeve 31 is threaded for the reception of a collar 34 forming the inner end of air chamber 35. The collar 34, for example, is secured by a pin 36 to the sleeve 31. The chamber 35 is also defined by a sliding annular member or cup 37 which has a cylindrical shell 38 sliding over the periphery of a grooved flange 39 on the collar 34. An O-ring 40 is located in the groove of the flange 39 and bears against the inner surface of the shell 38. At its forward or outer end, the cup 37 has a reduced diameter shoulder 41 and an inwardly turned grooved lip 42. The grooved lip 42 is located circumjacent the exterior of the sleeve 31 and an O-ring 43 carried in the groove of the lip 42 has sliding contact with the sleeve 31.

The rim half 30 is rigidly mounted in an annular recess 44 formed on the front or outer end of the cup 37, for example, by being welded in place or by suitable machine screws (not shown). The rim half 30 also carries a nut 45 into which is threaded a guide rod 46 which extends rearwardly and through a guide sleeve 47 secured on the outer side of the lever 20.

At the outer edges of the rim halves 29 and 30, each of them is contoured to form an inwardly and upwardly open recess 48 and 49, respectively, for the reception of one of two rim beads 50 of a pneumatic tire casing generally indicated at 51. It will be observed, particularly in FIG. 1, that the diameter of the inner side of the recesses 38 and 39 is the same, but that the outer diameter of a lip 52 on the rim half 29 and adjacent the recess 48 is smaller than the outer diameter of a corresponding lip 53 on the rim half 30 and adjacent the recess 49. The lesser diameter of the rim 29 simplifies the placement of the tire casing 51 on the rims 29 and 30, it being easier to force the rim beads 50 over the lip 52 than over the lip 53, and thus insures that once placed on the rim the tire casing 51 will not inadvertently jump off the back side of the rim 30.

The air supply line 28 is connected to two branch lines 54 and 54a. The air line 54 is coupled to an air passage 55 leading to the air chamber 35. When air is admitted into the chamber 35, it causes the cup 37 to slide away from the collar 34 moving the rim half 30 over adjacent the rim half 29. A series of small stops 56 may be welded or otherwise positioned on the inner surface of one or the other of the rims 29 or 30 to prevent their being pushed into contact with each other by air in the chamber 35. The air line 54a is coupled to a passageway 57 through the rim 30 leading to the space between the rim halves 29 and 30 and to the interior of the casing 51 when it is positioned as illustrated in FIGS. 2 and 3.

When the lever 20 is swung from the rear (dotted line) position to the forward position illustrated in FIG. 1, the air control valve 27 is actuated to open the line 28 and branch lines 54 and 54a to the exhaust line 28a. This relieves the air pressure in the interior of a previously inflated tire 51 in the position illustrated in FIG. 3. The rim beads 50 of the tire 51 may then be squeezed together and disengaged from the recesses 48 and 49, dropping the beads 50 between the rims 29 and 30. The lower side of the tire 51 is then pulled off. The lower side of the rim 29 and then the tire 51 is lifted upwardly out from between the rims 29 and 30.

The operator mounts a just-molded tire on the rims 29 and 30 by reversing the procedure, i.e., by slipping the upper half of the tire over the rim 29 and then down between the rims 29 and 30. He then slips the bottom half of the tire over the bottom half of the rim 29 and lifts the tire until its rim beads 50 hang up on the recesses 48 and 49 of the rim halves 29 and 30.

The operator then opens a foot pilot valve 58 located in a position of easy access at the front of the apparatus 10 which is connected by an air line 59 to the air control valve 27 which feeds air to the air line 28 and thus to the branch lines 54 and 54a. Admission of air to the pilot line 59 also causes the air control valve 27 to shut the exhaust passage 28a.

Air is admitted to the chamber 35 and the rim halves 29 and 30 are moved into proximity to allow the operator to guide the rim beads 50 of the tire into initial position on the rims 29 and 30, as illustrated in FIG. 2. At the same time air is admitted through the line 54a into the interior of the casing 51 which causes it to expand, forcing its rim beads 50 into snug contact in the recesses 48 and 49 and simultaneously causing the movable rim half 30 to slide away from the stationary rim half 29. The larger areas of the rim halves 29 and 30 are acted upon by air admitted from the line 54a and overcome the pressure in the chamber 35 separating the rim halves 29 and 30 (against the resistance of the air in the chamber 35) until the shoulder 41 of the cup 37 engages the front side of the flange 39 of the collar 34 as illustrated in FIG. 3. In this position the two rims 29 and 30 are spaced from each other an axial distance equal to the normal space of a road rim for the particular casing 51.

The operator then trips the apparatus 10 to shut the molds and swing the lever 20 to the rear position. When the actuator 26 again engages the air control valve 27, the valve 27 is shifted to retain the air pressure on the line 28 so the operator can release the foot pilot valve 58 and air pressure remains on the tire 51 during the next molding cycle. As explained above, the air admitted into the interior of the casing 51 is at a pressure in excess of that normally present in a tire during service so as to effect the post curing stretching of tire cords generally indicated at 60.

Having described my invention, I claim:

1. A rim apparatus for post curing inflation of pneumatic tires, comprising, in combination, a first disc rigidly mounted on one end of a cylindrical member, an annular member having an enlarged cylindrical shell coaxial with said cylindrical member, said shell having an open end extending away from said first disc, a collar secured to said cylindrical member for closing said open end of said shell, an air seal for closing the space between said collar and said shell, a second disc mounted on said annular member, an air seal closing the space between said annular member and said cylindrical member adjacent said second disc, means for admitting air into the annular space defined by said annular member, said shell and said collar for forcing said annular member, said shell and said second disc axially toward said first disc and means for feeding air under pressure into the interior of the space defined by said discs, said cylindrical member and a tire casing mounted on the periphery of said first and second discs with the rim beads of the tire casing in a half-tire groove in the inner peripheral edge of each of said discs for urging said rim beads tightly into said grooves, for separating said discs and for applying pressure to the interior of said tire casing.

2. Apparatus for post curing inflation of pneumatic tires, said apparatus comprising a pair of discs, each of said discs having a half-tire rim groove in the inner side of its peripheral edge, an axially extending cylindrical member secured to the center of the first of said discs coaxially therewith, an annular member slidingly mounted on said cylindrical member and secured to the second of said discs coaxially therewith, said annular member having an enlarged cylindrical shell coaxial with said cylindrical member, said shell having an open end extending away from said first one of said discs, said second of said discs having a center opening that is closed by said annular member and through which said cylindrical member extends, sealing means for closing said center opening around said cylindrical member, a collar secured to said cylindrical member for closing the said open end of said shell, an air seal for closing the space between said collar and said shell, (1) means for admitting air into the space between said discs and into a tire casing mounted thereon with the beads of said tire casing in said rim grooves for urging said rim beads tightly into said grooves and for applying pressure to the interior of said tire casing, (2) means for admitting air into the annular space defined by said annular member, said shell and said collar for forcing said annular member, said shell and said second of said discs axially toward said first of said discs to a minimum spacing, (3) means for releasing air from the annular space defined by said annular member, said shell and said collar for moving said second disc axially away from said first disc to a maximum spacing, and (4) means for releasing air from the interior of a tire casing mounted on said discs.

(References on following page)

References Cited by the Examiner

UNITED STATES PATENTS

| | | | |
|---|---|---|---|
| 2,826,783 | 3/58 | Robbins | 18—18 |
| 2,835,921 | 5/58 | White | 18—18 |
| 2,920,664 | 1/60 | Lomen et al. | 144—288.1 |
| 2,924,255 | 2/60 | Robbins | 144—288.1 |
| 2,948,921 | 8/60 | Laube et al. | 18—17 XR |
| 2,960,130 | 11/60 | Smyser | 157—13 XR |
| 2,963,737 | 12/60 | Soderquist | 18—2 |
| 2,970,342 | 2/61 | Frohlich et al. | 18—17 |
| 2,978,741 | 4/61 | Soderquist | 18—2 |
| 2,987,770 | 6/61 | Powell | 18—18 |
| 2,989,779 | 6/61 | White | 18—18 |
| 3,008,180 | 11/61 | Woodhall | 18—2 |
| 3,052,920 | 9/62 | Harris | 18—17 |
| 3,065,499 | 11/62 | Brundage et al. | 18—2 |
| 3,067,457 | 12/62 | Dennis et al. | 18—18 XR |

WILLIAM J. STEPHENSON, *Primary Examiner.*